Patented Apr. 14, 1953

2,635,043

UNITED STATES PATENT OFFICE 2,635,043

METHOD OF DRYING RICE IN THE FIELD

Charles H. Branstetter, Jr., Sacramento, Calif.

No Drawing. Application June 20, 1950,
Serial No. 169,301

1 Claim. (Cl. 71—2.3)

This invention is directed to, and it is an object to provide, a novel method of accelerating the drying of rice in the field; i. e. before harvest of the rice.

Another object of the invention is to provide a method of drying rice in the field which contemplates the spraying of a chemical solution upon the rice heads and the kernels included therein; the application of the spray being accomplished preferably by an airplane with spraying mechanism thereon.

A further object of the invention is to provide a method of drying rice in the field, which not only accelerates the drying process but improves the milling quality of the rice.

An additional object of the invention is to provide a method of drying rice in the field, which is efficient, economical, and produces a uniformity of drying not otherwise obtainable.

A further object of the invention is to provide a practical and reliable method of drying rice in the field, and yet one which will be exceedingly effective for the purpose for which it is designed.

These objects are accomplished in the manner as will fully appear by a perusal of the following specification and claim.

Referring more particularly to the details of the invention, the method contemplates the following steps:

After the rice has grown to maturity, and preferably after the water has been withdrawn from the rice fields, the moisture content of the kernels of the rice is carefully checked—from time to time—as the harvest season approaches.

When the moisture content of the rice kernels approaches but is not below approximately 20% a chemical solution, hereinafter identified, is sprayed upon the rice. This spraying is preferably accomplished by means of an airplane fitted with spraying mechanism; airplane application of the chemical solution being more efficient, more rapid, and attaining better and more uniform coverage.

The chemical, which is employed in the spray, is sodium pentachlorophenate whose formula is $C_6Cl_5ONa$; such chemical being prepared in a relatively dilute aqueous solution. More specifically the solution is comprised of five pounds of sodium pentachlorophenate to five gallons of water, together with one-half gallon of summer oil, per acre. The above provides a concentrated solution which, for use, is further diluted with water to attain effective coverage in proper and limited amount when applied by airplane spray.

As the chemical is a water soluble sodium salt of pentachlorophenol, the solution is readily prepared and may be sprayed by airplane without difficulty.

Further, the application is in such relatively small quantity to the kernels of the rice that toxicity to humans does not result.

After application of the spray to the rice, moisure content of the kernels falls off rapidly and drying of the rice is materially accelerated, permitting of harvesting in advance of conventionally field dried rice. The accelerated drying is very evident after a few days, and by test it has been found that after eight days, under normal weather conditions, the moisture content has dropped substantially. Also, with the herein provided method, rice which otherwise might have to be cut and mechanically dehydrated, can be caused to wholly dry in the field, thus avoiding the necessity and expense of mechanical dehydration.

Extensive tests have also established that the herein described method causes the rice within a given field area to dry more uniformly, and additionally shatter is lessened. There is thus a considerable saving of from one to three sacks of rice per acre.

Another great advantage of the method is that the rice, dried by the present method, has a substantially improved milling quality; i. e. permitting the husks to be removed by milling with lessened breakage of the kernels.

The described method of drying rice in the field is very practical and reliable and eliminates much of the difficulties heretofore encountered either in sun drying in the field, or harvesting green and mechanical dehydrating.

From the foregoing description it will be readily seen that there has been produced such a method as substantially fulfills the objects of the invention as set forth herein.

While this specification sets forth the present and preferred details of the invention, still in practice such deviations from such details may be resorted to as do not form a departure from the spirit of said invention as defined by the appended claim.

Having thus described the invention, the following is claimed as new and useful, and upon which Letters Patent are desired:

The method of drying rice in the field as the harvest season approaches which comprises applying a solution of sodium pentachlorophenate thereto at a rate of about five pounds of the pentachlorophenate per acre when the moisture content of the rice kernels approximates but is not less than about twenty per cent.

CHARLES H. BRANSTETTER, JR.

References Cited in the file of this patent

UNITED STATES PATENTS

| Number | Name | Date |
|---|---|---|
| 2,329,680 | Wilkerson | Sept. 14, 1943 |
| 2,368,276 | Torley et al. | Jan. 30, 1945 |
| 2,368,601 | Torley et al. | Jan. 30, 1945 |
| 2,416,259 | Kagy et al. | Feb. 18, 1947 |